(12) United States Patent
Santos et al.

(10) Patent No.: US 12,009,159 B2
(45) Date of Patent: *Jun. 11, 2024

(54) MEMBRANE SWITCHES CONFIGURED TO SENSE PRESSURE APPLIED FROM COMPLIANT AND RIGID OBJECTS

(71) Applicant: Xerox Corporation, Norwalk, CT (US)

(72) Inventors: Daniel Oliveira Santos, San Francisco, CA (US); Trevor Kemps Wesolowski, Oakland, CA (US); Abraham Baldwin McKay, Oakland, CA (US); Jeffrey Michael Scott, Martinez, CA (US); Kylee Rae Burgess, Sunnyvale, CA (US); Janos Veres, San Jose, CA (US); Wesley A. Waugh, Sunnyvale, CA (US); Miguel Alberto Piedrahita, Palo Alto, CA (US); Michael K. Wong, Sunnyvale, CA (US)

(73) Assignee: Xerox Corporation, Norwalk, CT (US)

( * ) Notice: Subject to any disclaimer, the term of this patent is extended or adjusted under 35 U.S.C. 154(b) by 441 days.

This patent is subject to a terminal disclaimer.

(21) Appl. No.: 17/228,991

(22) Filed: Apr. 13, 2021

(65) Prior Publication Data

US 2022/0328259 A1 Oct. 13, 2022

(51) Int. Cl.
*H01H 1/029* (2006.01)
*C09D 11/52* (2014.01)
(Continued)

(52) U.S. Cl.
CPC .............. *H01H 1/029* (2013.01); *C09D 11/52* (2013.01); *H01H 13/14* (2013.01);
(Continued)

(58) Field of Classification Search
CPC ...... H01H 1/029; H01H 13/14; H01H 13/023; H01H 2209/068; H01H 2227/024; C09D 11/52

See application file for complete search history.

(56) References Cited

U.S. PATENT DOCUMENTS

| 3,584,162 A | 6/1971 | Krakinowski |
| 4,017,697 A * | 4/1977 | Larson ................. H01H 13/702 200/512 |

(Continued)

FOREIGN PATENT DOCUMENTS

EP 2820518 B1 * 4/2018 ......... E05D 11/1064

OTHER PUBLICATIONS

U.S. Appl. No. 17/228,998, filed Apr. 13, 2021, Membrane Switches Configured to Sense Pressure Applied From Compliant and Rigid Objects.

(Continued)

*Primary Examiner* — Kyung S Lee
(74) *Attorney, Agent, or Firm* — Fox Rothschild LLP

(57) ABSTRACT

A pressure-activated membrane switch and methods of use are provided. The pressure-activated membrane switch includes an electrically-conductive membrane, and a compliant conductive material having an electrically-conductive inner surface, wherein contact between the electrically-conductive membrane and the electrically-conductive inner surface of the compliant material is configured to cause an electrical circuit, of which the switch is a part, to close. The pressure-activated membrane switch further includes a plurality of spacers dispersed between the electrically-conductive membrane and the compliant conductive material. The plurality of spacers form one or more gaps between the electrically-conductive membrane and the compliant conductive material, and, with an application of pressure against the compliant conductive material, the compliant conductive (Continued)

material is configured to deform between the one or more gaps to contact the electrically-conductive membrane.

15 Claims, 10 Drawing Sheets

(51) Int. Cl.
    *H01H 13/02*     (2006.01)
    *H01H 13/14*     (2006.01)

(52) U.S. Cl.
    CPC ..... *H01H 13/023* (2013.01); *H01H 2209/068* (2013.01); *H01H 2227/024* (2013.01)

(56) References Cited

U.S. PATENT DOCUMENTS

| | | | |
|---|---|---|---|
| 4,362,911 A | | 12/1982 | Sears et al. |
| 4,508,942 A | | 4/1985 | Inaba |
| 4,677,417 A | | 6/1987 | Amagishi |
| 4,866,412 A | | 9/1989 | Rzepczynski |
| 4,935,841 A | | 6/1990 | Jonsson et al. |
| 5,198,629 A | | 3/1993 | Hayashi et al. |
| 5,828,289 A | * | 10/1998 | Burgess ............... H01H 3/142 338/114 |
| 6,360,612 B1 | | 3/2002 | Trantzas et al. |
| 6,774,331 B1 | * | 8/2004 | Den Ridder ........... H01H 3/141 200/86 R |
| 7,726,207 B2 | | 6/2010 | Orlewski et al. |
| 9,030,289 B2 | * | 5/2015 | Lai ........................ G06F 3/045 338/47 |
| 9,671,297 B2 | | 6/2017 | Sibbett |
| 9,761,790 B2 | | 9/2017 | Yoo et al. |
| 9,831,051 B2 | | 11/2017 | Maier |
| 10,121,121 B1 | | 11/2018 | De Bonet et al. |
| 10,390,752 B2 | | 8/2019 | Ashoori et al. |
| 10,442,091 B2 | | 10/2019 | Kondoh et al. |
| 10,561,581 B2 | | 2/2020 | Wong et al. |
| 10,628,725 B1 | | 4/2020 | Mei et al. |
| 10,690,559 B1 | | 6/2020 | Liu et al. |
| 10,859,458 B2 | | 12/2020 | Asakura |
| 10,928,259 B2 | | 2/2021 | Morita et al. |
| 11,367,581 B1 | * | 6/2022 | Santos .................. H01H 13/14 |
| 2002/0014968 A1 | | 2/2002 | Fitzgerald et al. |
| 2003/0000821 A1 | * | 1/2003 | Takahashi ........... H01H 13/785 200/512 |
| 2005/0253723 A1 | | 11/2005 | Shafer |
| 2010/0224474 A1 | | 9/2010 | Jeffery |
| 2010/0242629 A1 | | 9/2010 | Leuenberger et al. |
| 2011/0140853 A1 | | 6/2011 | Jung et al. |
| 2012/0040610 A1 | | 2/2012 | Moosavi et al. |
| 2012/0118066 A1 | | 5/2012 | Majidi et al. |
| 2014/0215928 A1 | | 8/2014 | Desgorces et al. |
| 2014/0243709 A1 | | 8/2014 | Gibson et al. |
| 2014/0253333 A1 | | 9/2014 | Patterson et al. |
| 2015/0311012 A1 | | 10/2015 | Wada et al. |
| 2016/0056444 A1 | | 2/2016 | Hwang et al. |
| 2017/0065464 A1 | | 3/2017 | Heil et al. |
| 2017/0089775 A1 | | 3/2017 | Hsu et al. |
| 2017/0207729 A1 | | 7/2017 | Kondoh et al. |
| 2017/0256155 A1 | | 9/2017 | Sengstaken, Jr. |
| 2018/0093814 A1 | | 4/2018 | Espinosa |
| 2018/0288889 A1 | | 10/2018 | Fordham et al. |
| 2018/0319016 A1 | | 11/2018 | Ibrocevic et al. |
| 2019/0101462 A1 | | 4/2019 | Kim |
| 2019/0103548 A1 | | 4/2019 | Sugawara et al. |
| 2019/0151160 A1 | | 5/2019 | Huq |
| 2019/0231083 A1 | | 8/2019 | Hsu et al. |
| 2022/0020253 A1 | | 1/2022 | Mei et al. |
| 2022/0125335 A1 | | 4/2022 | Rofe et al. |

OTHER PUBLICATIONS

Pressure-Sensitive Conductive Sheet (Velostat/Linqustat), https://www.adafruit.com/product/1361, Nov. 8, 2019.

Information about Related Patents and Patent Applications, see section 4 of the accompanying Information Disclosure Statement Letter, which concerns Related Patents and Patent Applications.

* cited by examiner

MEMBRANE SWITCHES CONFIGURED TO SENSE PRESSURE APPLIED FROM COMPLIANT AND RIGID OBJECTS

BACKGROUND

The present disclosure relates to pressure-sensitive membrane switches and, in particular, to pressure-sensitive membrane switches configured to sense pressure from one or more rigid objects.

Membrane keypads or switches are configured to sense the pressure and removal of a compliant material from a surface, causing an electrical circuit to open and close. Standard membrane switches are capable of sensing pressure applied by a human finger and, as such, are widely used as touch-buttons on electronics and appliances, such as microwave ovens, dishwashers, and other suitable electronics. Membrane switches are economical, being produced in large scales at low cost, resulting in them being widely used in many industries which incorporate touch-buttons.

Traditional membrane switches rely on the compliance, or squishiness, of a human finger to bend a membrane layer around a plurality of rigid columns, causing the membrane layer to contact another membrane layer, causing an electrical circuit to close. While the human finger is used by example, traditional membrane switches can function when pressure is applied from any suitable compliant material. However, the functionality of traditional membrane switches decreases with the application of pressure from rigid objects.

Rigid objects deliver a load more directly to the columns rather than forming around the columns. This prevents the membrane layer from bending around the columns and contacting the other membrane layer. As a result, traditional membrane switches are less likely to detect pressure from a rigid object since the rigid object is less likely to cause the membrane layers to come into contact with each other. This decreases the usefulness of traditional membrane switches when the detection of rigid objects is desired or required.

For at least these reasons, membrane switches configured to detect pressure applied from one or more rigid objects is required.

SUMMARY

According to an aspect of the present disclosure, a pressure-activated membrane switch is provided. The pressure-activated membrane switch includes an electrically-conductive membrane, and a compliant conductive material having an electrically-conductive inner surface, wherein contact between the electrically-conductive membrane and the electrically-conductive inner surface of the compliant material is configured to cause an electrical circuit, of which the switch is a part, to close. The pressure-activated membrane switch further includes a plurality of spacers dispersed between the electrically-conductive membrane and the compliant conductive material. The plurality of spacers form one or more gaps between the electrically-conductive membrane and the compliant conductive material, and, with an application of pressure against the compliant conductive material, the compliant conductive material is configured to deform between the one or more gaps to contact the electrically-conductive membrane.

According to various embodiments, the compliant conductive material includes one or more of the following: a foam or a conductive fabric.

According to various embodiments, the compliant conductive material has a thickness of approximately 2 mm.

According to various embodiments, the spacers include a nonconductive material.

According to various embodiments, the electrically-conductive membrane includes polyester.

According to various embodiments, the electrically-conductive membrane includes a conductive ink. The conductive ink may include one or more of the following: carbon or silver.

According to various embodiments, the plurality of spacers form a series of columns.

According to various embodiments, the pressure-activated membrane switch is in electronic communication with one or more electronic devices.

According to another aspect of the present disclosure, a method is provided for activating a pressure-activated membrane switch. The method includes providing a pressure-activated membrane switch, including an electrically-conductive membrane, a compliant conductive material having an electrically-conductive inner surface, and a plurality of spacers dispersed between the electrically-conductive membrane and the compliant conductive material. The plurality of spacers form one or more gaps between the electrically-conductive membrane and the compliant conductive material. The method further includes deforming the compliant conductive material between the one or more gaps, causing the compliant conductive material to contact the electrically-conductive membrane, which causes an electrical circuit, of which the switch is a part, to close.

According to various embodiments, the deforming includes applying a pressure to an upper surface of the compliant conductive material towards the electrically-conductive membrane.

According to various embodiments, the method further includes passing an electric current through one or more of the following: the electrically-conductive membrane or compliant conductive material.

According to various embodiments, the pressure-activated membrane switch is in electronic communication with one or more electronic devices, and the method further includes, in response to the electrical circuit closing, causing the one or more electronic devices to perform an action.

According to various embodiments, the electrically-conductive membrane includes a conductive ink.

According to various embodiments, the providing includes screen-printing the conductive ink onto the electronically-conductive membrane.

According to various embodiments, the conductive ink includes one or more of the following: carbon or silver.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. When used in this document, the term "comprising" (or "comprises") means "including (or includes), but not limited to."

In this document, the term "approximately," when used in connection with a numeric value, is intended to include values that are close to, but not exactly, the number. For example, in some embodiments, the term "approximately" may include values that are within +/−10 percent of the value.

Other terms that are relevant to this disclosure are defined at the end of this Detailed Description section.

Figure 1:
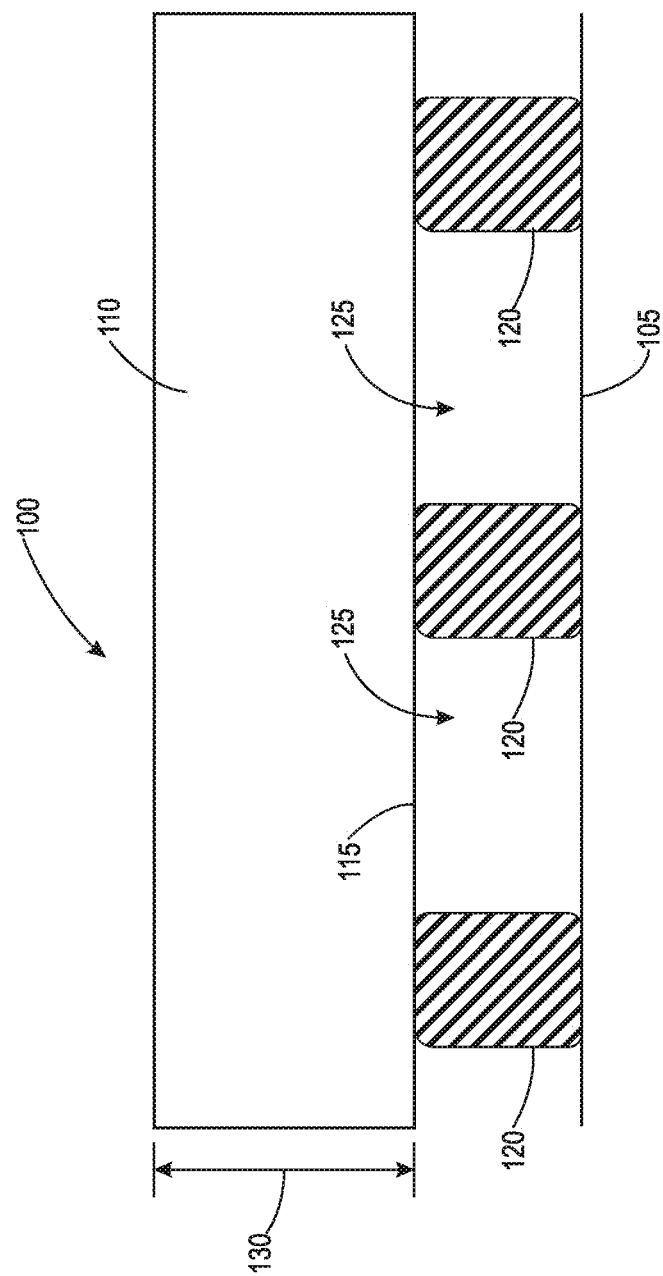
FIG. 1 is a side schematic view of a membrane switch having a compliant conductive material, in accordance with various embodiments of the present disclosure.

Referring now to FIG. 1, a side schematic view of a membrane switch 100 is illustratively depicted, in accordance with various embodiments of the present disclosure. According to various embodiments, the membrane switch 100 is a pressure-activated membrane switch.

The membrane switch 100 includes an electrically-conductive membrane 105 and a compliant conductive material 110. In an example embodiment, the electrically conductive membrane 105 includes sheets of polyester that are screen printed with carbon and/or silver conductive ink. It is noted, however, that the sheets may include other materials suitable for the application of conductive inks and/or other conductive materials. It is also noted that other suitable forms of conductive inks may be implemented while maintaining the functionality of the present disclosure. In an example embodiment, the electrically-conductive membrane 105 is approximately 0.005 inches thick. Other suitable thicknesses may be implemented that maintain the functionality of the present disclosure.

The compliant conductive material 110 includes one or more conductive surfaces 115. According to various embodiments, an electric current is passed through one or both of the conductive membrane 105 and/or the compliant conductive material 110. When a conductive surface 115 of the compliant conductive material 110 comes into contact with the conductive membrane 105, an electrical circuit is closed. When the conductive surface 115 of the compliant conductive material 110 is removed from the conductive membrane 105, the electrical circuit is opened. The opening and closing of this electrical circuit can be measured, enabling the membrane switch 100 to function as an electrical switch.

The membrane switch 100 may be coupled to and/or in electronic communication with one or more electronic devices (for example, computers, computing devices, appliances, etc.). According to various embodiments, the membrane switch 100 is configured to cause the one or more electronic devices to perform an action in response to the one or more electronic devices detecting a change in the electrical circuit of the membrane switch 100.

Positioned between the conductive membrane 105 and the compliant conductive material 110 are one or more spacers 120 configured to separate the conductive membrane 105 from the conductive surface 115 of the compliant conductive material 110. The spacers 120 include a nonconductive material. According to various embodiments, the spacers 120 include one or more polymers (e.g., UV-curable urethane polymers). It is noted, however, that the spacers 120 may additionally or alternatively include other suitable materials. According to various embodiments, the spacers 120 have a thickness of approximately 30 microns. However, other suitable thicknesses may be implemented, while maintaining the spirit and functionality of the present disclosure. The spacers 120, as shown in FIG. 1, are in a column formation. It is noted, however, that the spacers 120 may be of any suitable shape, size, and/or thickness configured to separate the conductive membrane 105 from the conductive surface 115 of the compliant conductive material 110, while enabling the conductive surface 115 of the compliant conductive material 110 to pass through gaps 125, formed by a configuration and placement of the spacers 120, in order for the conductive surface 115 to contact the conductive membrane 105.

The compliant conductive material 110 includes a material having a suitable thickness 130 and plasticity such that, when a pressure is applied to the compliant conductive material 110 in the direction of the conductive membrane 105, the compliant conductive material is configured to mold around the spacers 120 and through the gaps 125 to contact the conductive membrane 105. In an example embodiment, the compliant conductive material 110 has a thickness 130 of approximately 2 mm. It is noted, however, that the compliant conductive material 110 may have other suitable thicknesses 130 while maintaining the spirit of the present disclosure. For example, in some embodiments, the thickness is less than 2 mm. The compliant conductive material 110 may include, for example, conductive foam (e.g., carbon-impregnated conductive foam and/or other suitable conductive foams), fabric (such as conductive fabric), and/or other suitable compliant material. In some embodiments, the conductive foam includes polyurethane foam. It is noted, however, that other suitable foams may be used.

Traditional membrane switches rely on the compliability of a human finger to push an upper conductive membrane through gaps to contact a lower conductive membrane. This hinders the functionality of traditional membrane switches in that rigid objects are less likely to cause the upper and lower conductive membranes to come into contact with each other, preventing the conductive membranes from closing the electrical circuit. The incorporation of the compliant conductive material 110 into the membrane switch 100 of FIG. 1 corrects for this loss of functionality by enabling the circuit to close with the application of pressure from both compliable and rigid objects.

Figure 2:
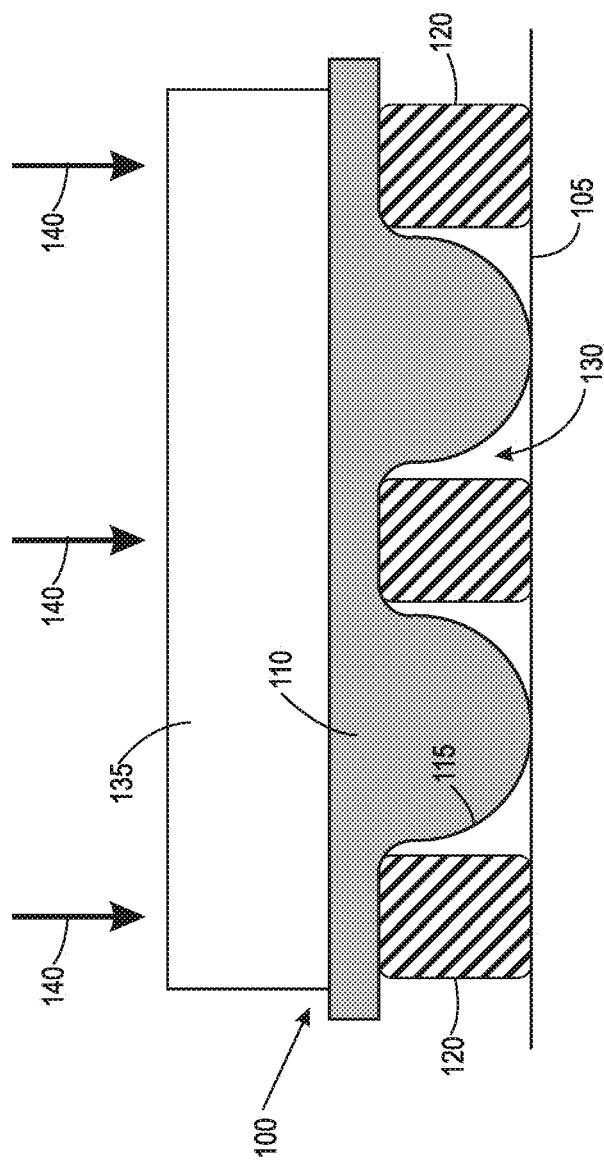
FIG. 2 is a side schematic view of the membrane switch of FIG. 1 being compressed by a rigid object, in accordance with various embodiments of the present disclosure.

As shown in FIG. 2, a rigid object 135 is applied to an upper surface of the compliant conductive material 110 of the membrane switch 100. The rigid object 135 applies a force in direction 140 toward the conductive membrane 105. This force causes a compression of the compliant conductive material 110, causing portions of the compliant conductive material 110 to pass through the gaps 130 and contact the conductive membrane 105.

Since the compliant conductive material's 110 movement through the gaps 130 is due to the compression of the compliant conductive material 110 and not due to the shape or compliability of the object compressing the compliant conductive material 110, the object compressing the compliant conductive material 110 need not be compliant in order to be able to close the circuit. The membrane switch 100 thus is configured to sense pressure being applied from both rigid and compliant objects, which is an improvement upon traditional membrane switches.

Figure 3:
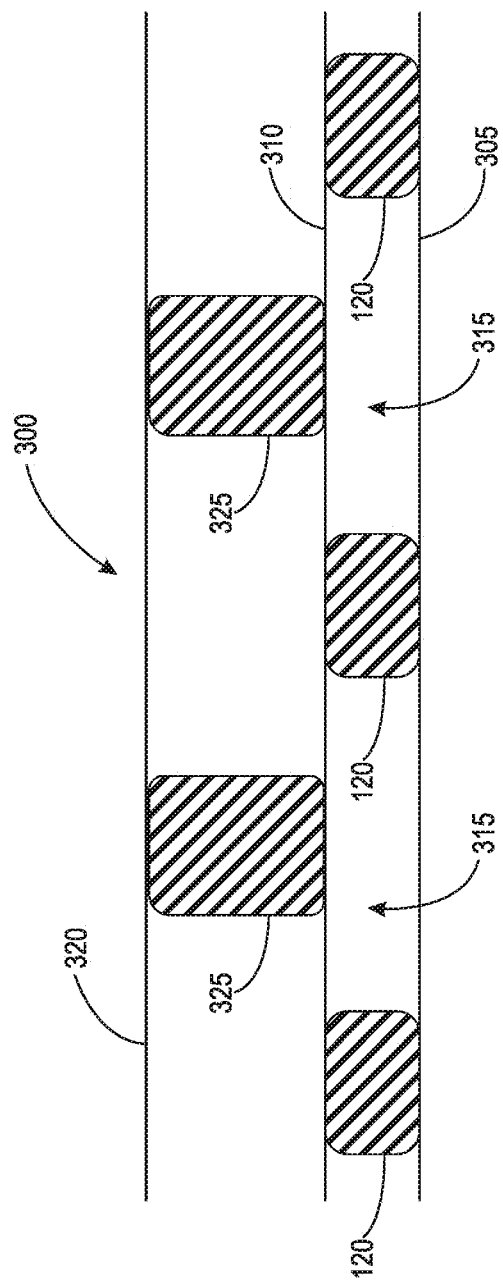
FIG. 3 is a side schematic view of a membrane switch having a series of rigid columns, in accordance with various embodiments of the present disclosure.

Referring now to FIG. 3, a side schematic view of a conductive membrane switch 300 having a plurality of electrically-conductive membranes 305, 310, is illustratively depicted, in accordance with various embodiments of the present disclosure. According to various embodiments, the membrane switch 300 is a pressure-activated membrane switch.

The membrane switch 300 includes a first conductive membrane 305 and a second conductive membrane 310. In an example embodiment, the electrically conductive membranes 305, 310 include sheets of polyester that are screen printed with carbon and/or silver conductive ink. It is noted, however, that the sheets may include other materials suitable for the application of conductive inks and/or other conductive materials. It is also noted that other suitable forms of conductive inks may be implemented while maintaining the functionality of the present disclosure. In an example embodiment, the electrically-conductive membranes 305, 310 are approximately 0.005 inches thick. Other suitable thicknesses may be implemented that maintain the functionality of the present disclosure.

According to various embodiments, an electric current is passed through one or both of the first conductive membrane 305 and/or the second conductive membrane 310. When second conductive membrane 310 comes into contact with the first conductive membrane 305, an electrical circuit is closed. When the second conductive membrane 310 is removed from the first conductive membrane 305, the electrical circuit is opened. The opening and closing of this electrical circuit can be measured, enabling the membrane switch 300 to function as an electrical switch.

The membrane switch 300 may be coupled to and/or in electronic communication with one or more electronic devices (for example, computers, computing devices, appliances, etc.). According to various embodiments, the membrane switch 300 is configured to cause the one or more electronic devices to perform an action in response to the one or more electronic devices detecting a change in the electrical circuit of the membrane switch 300.

Positioned between the first conductive membrane 305 and the second conductive membrane 310 are one or more spacers 120 configured to separate the first conductive membrane 305 from the second conductive membrane 310. According to various embodiments, the spacers 120 include a nonconductive material. The spacers 120, as shown in FIG. 3, are in a column formation. It is noted, however, that the spacers 120 may be of any suitable shape, size, and/or thickness configured to separate the first conductive membrane 305 from the second conductive membrane 310, while enabling one or both of the first conductive membrane 305 and the second conductive membrane 310 to pass through gaps 315, formed by a configuration and placement of the spacers 120, in order for the first conductive membrane 305 to contact the second conductive membrane 310.

According to various embodiments, the membrane switch 300 includes a mat 320 positioned exterior to the second conductive membrane 310. In an example embodiments, the mat 320 includes one or more polyester plastic sheets. It is noted, however, that other suitable mat 320 materials may be implemented, while maintaining the functionality of the present disclosure.

One or more columns 325 are positioned between the second conductive membrane 310 and the mat 320. According to various embodiments, the one or more columns 325 include a nonconductive material. The one or more columns 325 may include a same material as the spacers 120 or a different material. According to various embodiments, the mat 320 is inflexible. According to various embodiments, the mat 320 is flexible and is taut over the one or more columns 325. In some embodiments, the membrane switch 300 does not include the mat 320 and the exterior pressure is applied directly to the one or more columns 325.

The one or more nonconductive columns 325 are positioned on an outer surface of the second conductive membrane 310 such that, when a force is applied to the columns 325 in a direction of the first conductive membrane, the columns 325 are configured to move through the gaps 315. This causes the second conductive membrane to be pushed, by the columns 325, through the gaps 315, enabling the second conductive membrane 310 to contact the first conductive membrane 30.

Figure 4:
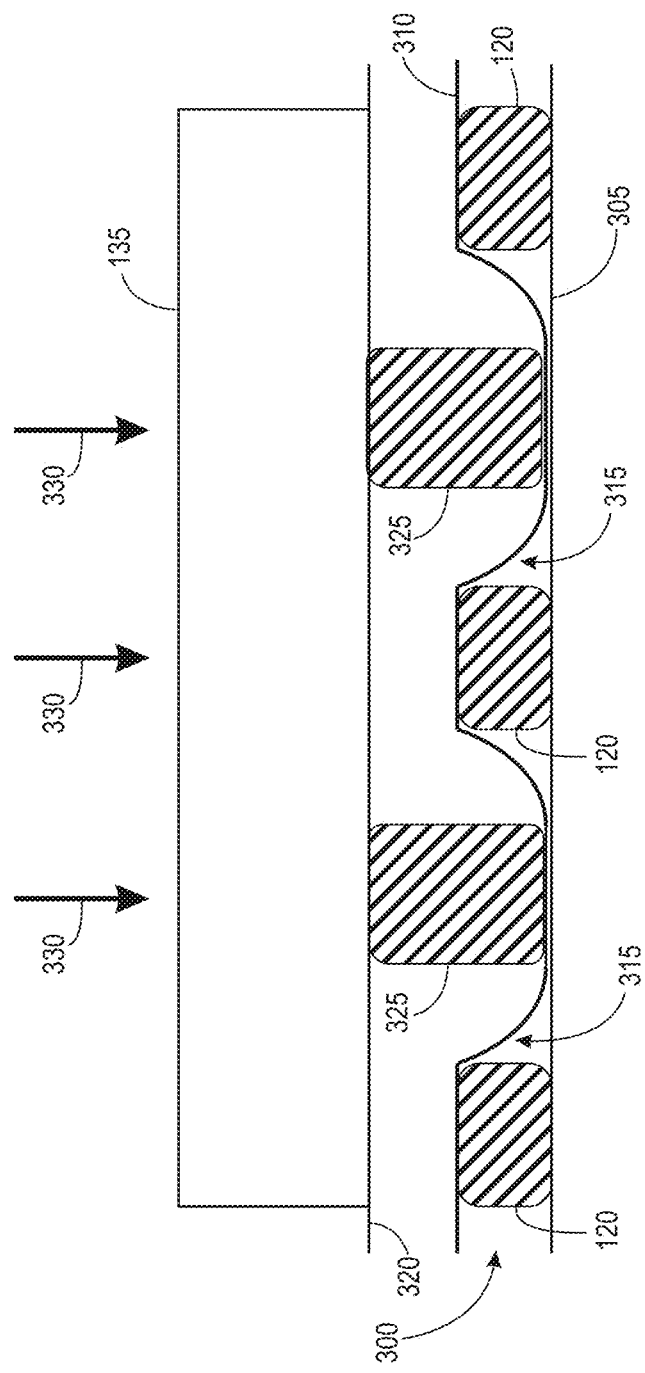
FIG. 4 is a side schematic view of the membrane switch of FIG. 3 being compressed by a rigid object, in accordance with various embodiments of the present disclosure.

As shown in FIG. 4, a rigid object 135 is applied to an upper surface of the mat 320 of the membrane switch 300. The rigid object 135 applies a force in direction 330 toward the first conductive membrane 305. This force against the mat 320 causes the one or more columns 325 to press against the second conductive membrane 310, which in turn causes the second conductive membrane 310 to deform and pass through the gaps 315 and contact the first conductive membrane 305, closing the electrical circuit.

Since the deformation of the second conductive membrane 310 is due to the force being applied to mat 320 and not due to the shape or compliability of the object applying force to the mat 320, the object applying force to the mat 320 need not be compliant in order to be able to close the circuit. The membrane switch 300 thus is configured to sense pressure being applied from both rigid and compliant objects, which is an improvement upon traditional membrane switches.

Figure 5:
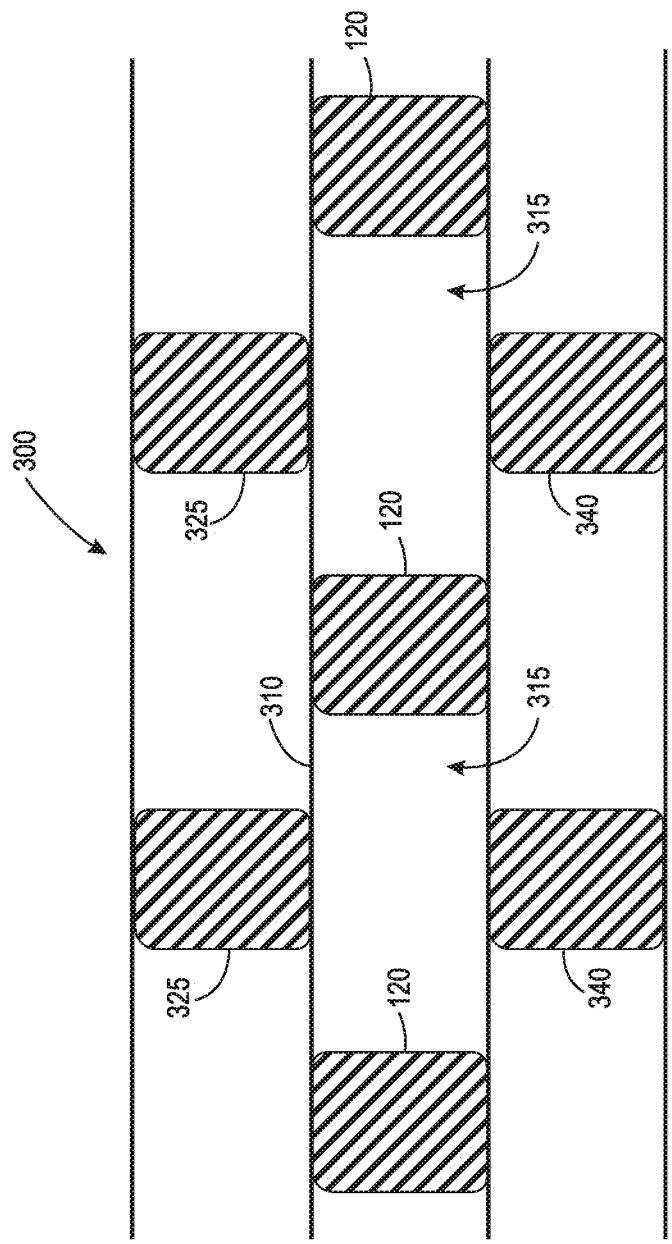
FIG. 5 is a side schematic view of a membrane switch having a series of rigid columns, in accordance with various embodiments of the present disclosure.
Figure 6:
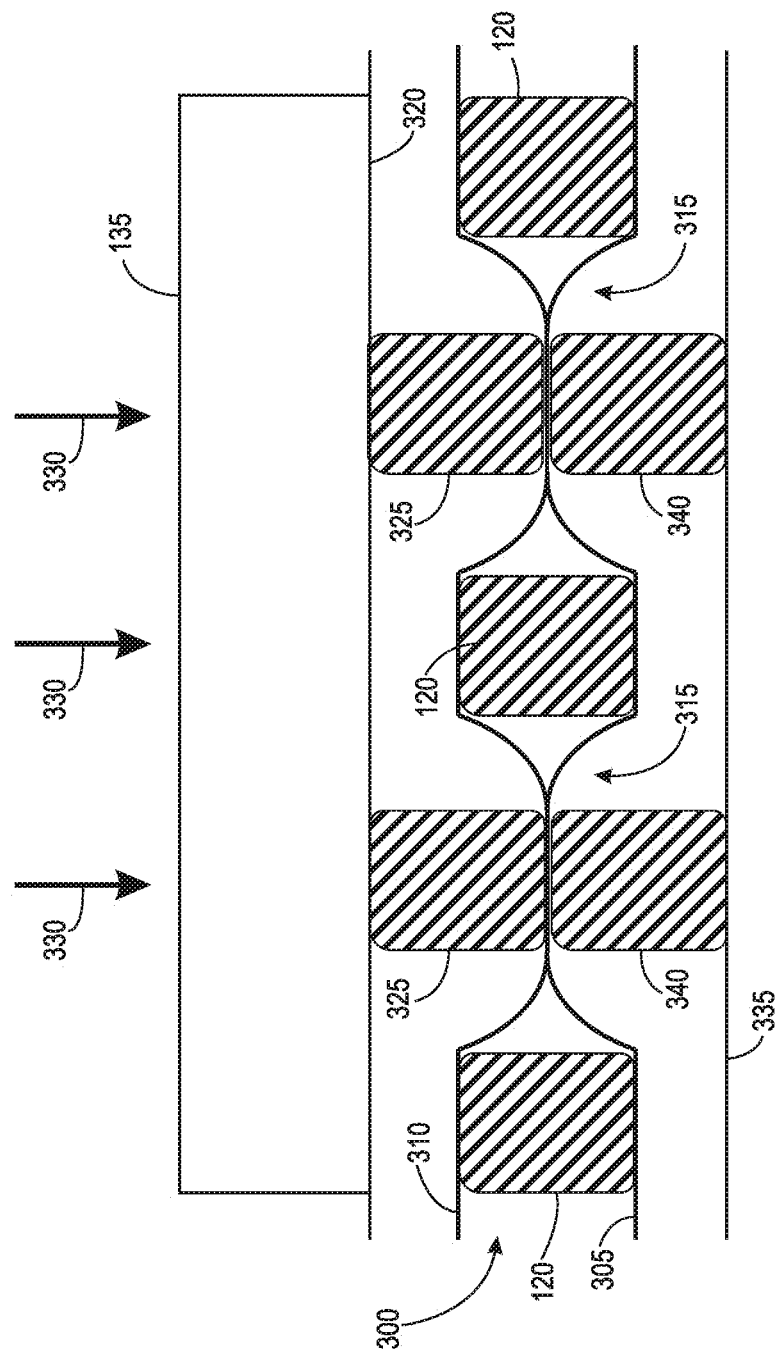
FIG. 6 is a side schematic view of the membrane switch of FIG. 5 being compressed by a rigid object, in accordance with various embodiments of the present disclosure.

According to various embodiments, the membrane switch 300 includes a lower surface 335 and one or more lower columns 340 positioned on an outer surface of the first conductive membrane 305 and between the first conductive membrane 305 and the lower surface 335, as shown in FIGS. 5-6. The lower surface 335 may be a separate layer applied to the one or more lower columns 340, and/or may be the surface on which the membrane switch 300 is placed.

As shown in FIGS. 5-6, the one or more columns 340 align with columns 325 such that, when pressure is applied to the mat 320, the force causes both the first membrane 305 and the second conductive membrane 310 to deform, causing the first conductive membrane 305 to contact the second conductive membrane 310, as shown in FIG. 6. According to various embodiments, a thickness of the one or more columns 340, the one or more columns 325, and/or a combined thickness of the one or more first columns 340 and the one or more second columns 325 is equal to or greater than a thickness of the one or more spacers 120. According to various embodiments, the columns 325, 340 include one or more polymers (e.g., UV-curable urethane polymers). It is noted, however, that the columns 325, 340 may additionally or alternatively include other suitable materials.

FIGS. 7A-8B depict architectures of example systems which can incorporate the membrane switches 100, 300 described herein. For example, the membrane switch 100, 300 may be incorporated into a shelving unit (e.g., system 700 shown in FIGS. 7A-7B), a user interface of an electronic device (e.g., the user interface 806 of a multifunction printer 800, shown in FIGS. 8A-8B), and/or other suitable electronic systems and devices.

Figure 7A:
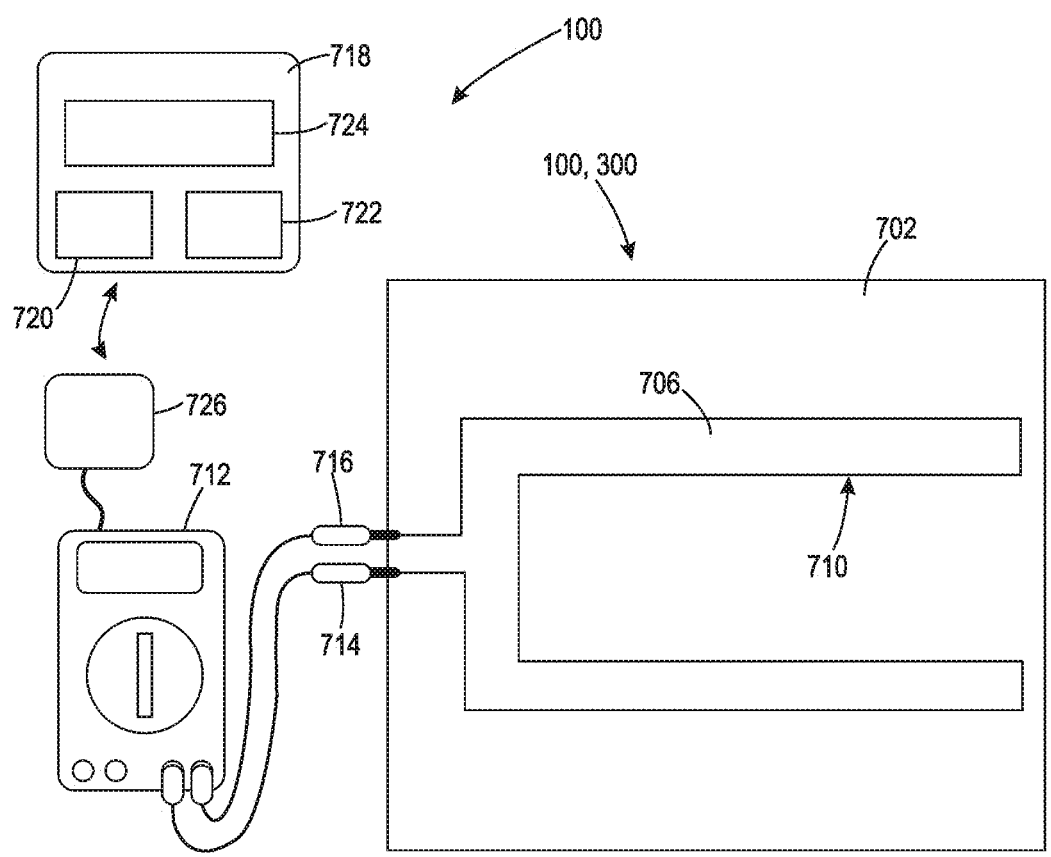
FIG. 7A is a top view of an example of a system for detecting one or more objects placed onto a membrane switch, in accordance with various embodiments of the present disclosure.
Figure 7B:
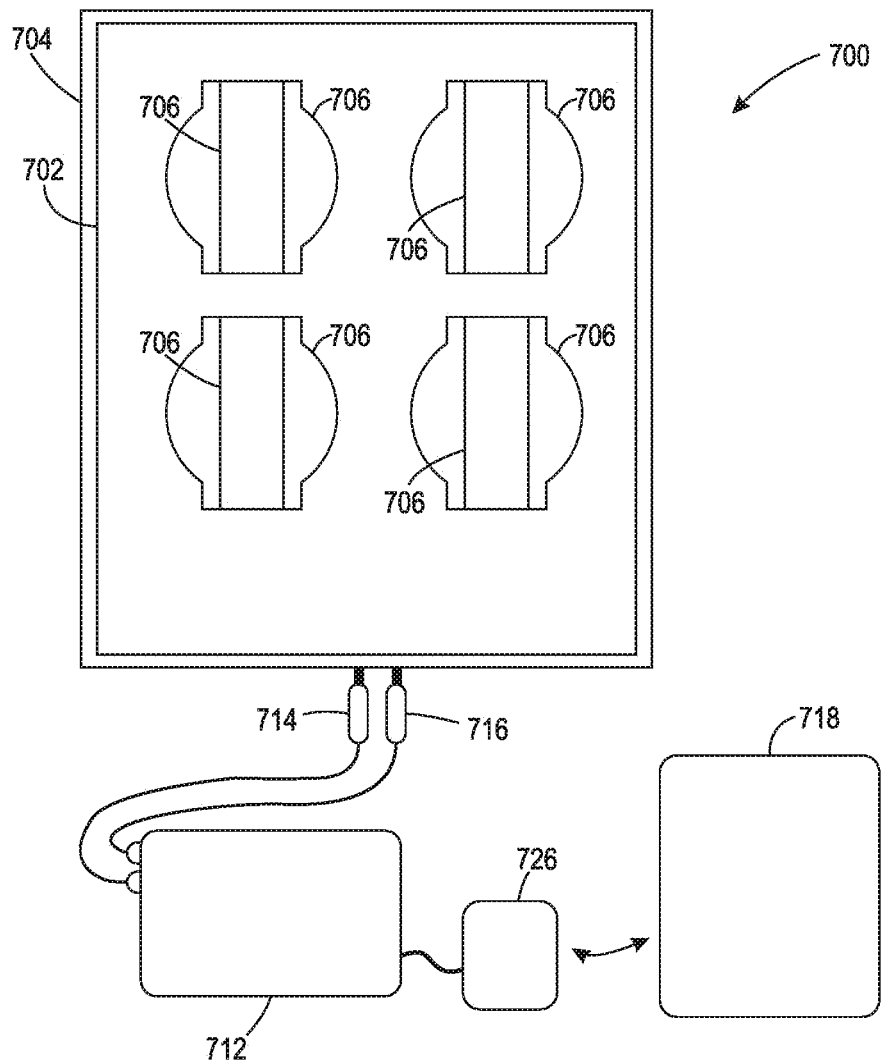
FIG. 7B is a bottom view of an example of a system for detecting one or more objects placed onto a membrane switch, in accordance with various embodiments of the present disclosure.

Referring now to FIGS. 7A-7B, a top view (FIG. 7A) and a bottom view (FIG. 7B) of a system 700 for detecting one or more objects placed onto a sensor (e.g., a membrane switch 100 or, alternatively, 300) positioned over a 3-dimensional structure 702, is provided.

According to various embodiments, the system 700 includes a membrane switch 100, 300. The membrane switch 100, 300 may include a stretchable fabric 704 having a plurality of fibers woven together. The membrane switch 100, 300 may further include a conductive material 706 fused to a plurality of the fibers. The stretchability of the stretchable fabric 704 may be due to the elasticity of the fibers of the stretchable fabric 704 and/or due to the organization of the fibers in the stretchable fabric 704. According to various embodiments, the stretchable fabric 704 may act as one or more of the conductive membranes and/or the mat, as described above. According to various embodiments, the stretchable fabric 704 may include polyester.

The conductive material 706 may include a conductive ink and/or any other suitable conductive material for fusing to the stretchable fabric 704. According to various embodiments, the conductive material 706 includes a conductive ink including silver such as, for example, that sold under the name "LIQUIDX®."

According to various embodiments, the conductive material 706 is applied to the stretchable fabric 704 in the shape of a conductive grid pattern 710. The conductive grid pattern 710 is configured to extend from an electrical measurement device 712, configured to measure an electrical change caused by the membrane switch 100, 300 caused by the placement of an object in one or more depressions 708. The electrical resistance measurement device 712 may be, for example, a multimeter, an ohmmeter, and/or any other suitable sensor. According to various embodiments, the conductive material 706 is positioned over each of the one or more depressions 708 such that the conductive material 706 is positioned over a portion of each of the recessed edges 718. According to some embodiments, the grid pattern 710 forms a closed loop, extending from a first probe 714 of the electrical measurement device 712 to a second probe 716 of the electrical measurement device 712.

The depressions 708 may be configured to receive all or a portion of a bottom surface of an object, enabling the object to stretch the stretchable fabric 704 into a cavity formed by the depression 708. For example, as shown in FIGS. 7A-7B, each of the depressions 708 is circular in nature, enabling a can, bottle, and/or similarly-shaped item to be set down within the depression 708.

According to various embodiments, the electrical measurement device 712 may be coupled to an electronic computing device 718 via wired and/or wireless connection and/or may be coupled to a transceiver 726 such as, for example, a Bluetooth®-based circuit, for remote resistance measurement. Any of the electrical measurement device 712, the electronic computing device 718, and/or the transceiver 726 may be in electronic communication with each other. The electronic computing device 718 may include a processor 720, a memory 722, a graphical user interface 724 (which may include a display), and/or any other suitable electronic and/or computational components. The electronic computing device 718 may be, for example, a desktop computer, a laptop computer, a tablet computer, an onsite and/or remote server, and/or any other suitable computing device.

Figure 8A:
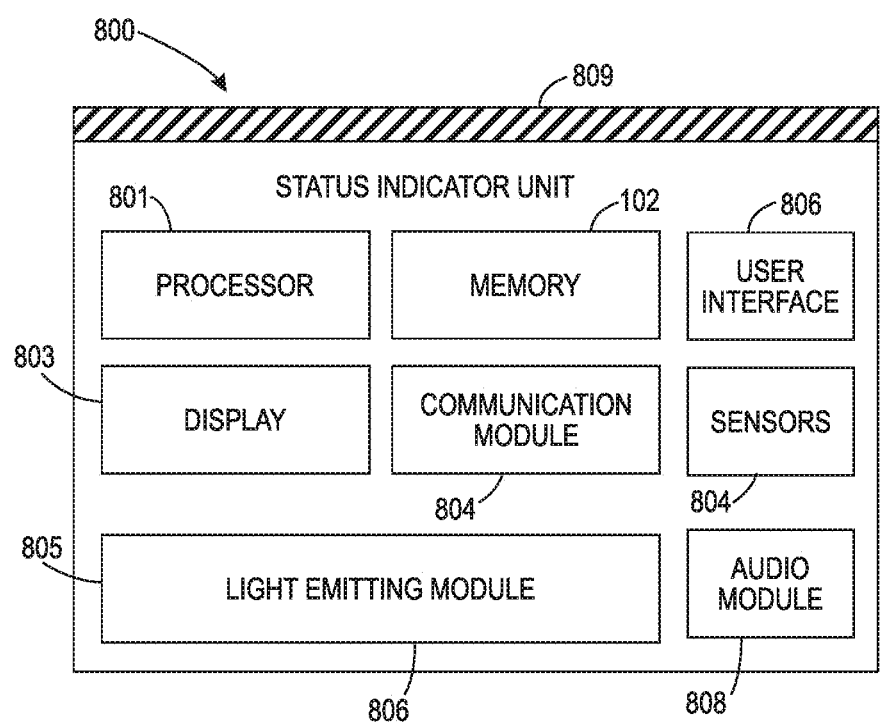
FIG. 8A illustrates an example block diagram of a status indicator feedback unit, according to one embodiment.

FIG. 8A is a block diagram that illustrates various elements of a status indicator feedback unit 800 that may be used to convey device status information using a light indicator feedback mechanism. In an embodiment, the status indicator feedback unit 800 is an electronic device that may include a processor 801 that is in electronic communication with the other elements of the status indicator feedback unit 800. The status indicator feedback unit may include programming instructions that, when executed, cause the processor 801 to convey the machine state, and its corresponding status, of a print device attached to the status indicator feedback unit, as discussed below, in conjunction with a light emitting module 805. The status indicator feedback unit 800 may also include a communication module 804 that is capable of transmitting and/or receiving data via one or more communication protocols to and/or from a print device that is attached to or is integral with the status indicator feedback unit 800.

In an embodiment, the status indicator feedback unit 800 may also include a user interface 806 to transmit to and/or receive instructions from a user of the print device. Example may include, without limitation, a keypad, a touchscreen, an audio interface, a membrane switch 100, 300, or the like. In some embodiments, the status indicator feedback unit 800 may also include a display 803 and a sound module 808 for providing device status information to a user, in addition to the LED feedback mechanism. In an embodiment, the audio module 808 may include, without limitation, a sound card, a sound chip, and other sound output circuitry that may outputs audio to a speaker, headphones, or the like (not shown).

In an embodiment, the status indicator feedback unit 800 may include one or more light emitting modules 805. In an embodiment, the light emitting module 805 may include a light emitting display 810 that provides a visual status indicator feedback with respect to a print device. In an embodiment, the light emitting display 810 may include one or more optical components for diffusing light from the one or more LEDs. For example, an optical component may include a lens structure made from a suitable material such as, without limitation, silicone, glass, clear resin, epoxy, or the like. In an embodiment, the lens structure may include a design configured to emit light according to a desired pattern (such as intensity, color, etc.). In an embodiment, the optical components may be configured (or designed) to project light in any desired pattern, angle, or direction for creating a dynamic feedback pattern.

In one embodiment, the status indicator feedback unit 800 may include one or more sensors 807 such as a proximity sensor, a biometric sensor, a radio frequency identification (RFID) tag for authenticating a user, or the like. In an embodiment, status indicator feedback unit 800 may only provide a status indicator feedback in response to a sensor detecting a user in the vicinity of a print device.

In an embodiment, to receive a machine state and other status information of a print device, the status indicator feedback unit 800 may also include an attachment interface 809 configured to attach to a corresponding counterpart of the print device, an MFD, or the like. The attachment interface may allow the status indicator feedback unit 800 to electronically and/or physically connect to a print device for sending and/or receiving information to and/or from the attached print device. An attachment interface 809 may include, without limitation, a wired connection (such as a cable), one or more connection ports (such as a data port), a docking station, or the like. Alternatively and/or additionally, the status indicator feedback unit 800 may communicate with the print device using wireless communications protocols such as Bluetooth®, Wi-Fi®, Zigbee®, or the like.

Figure 8B:
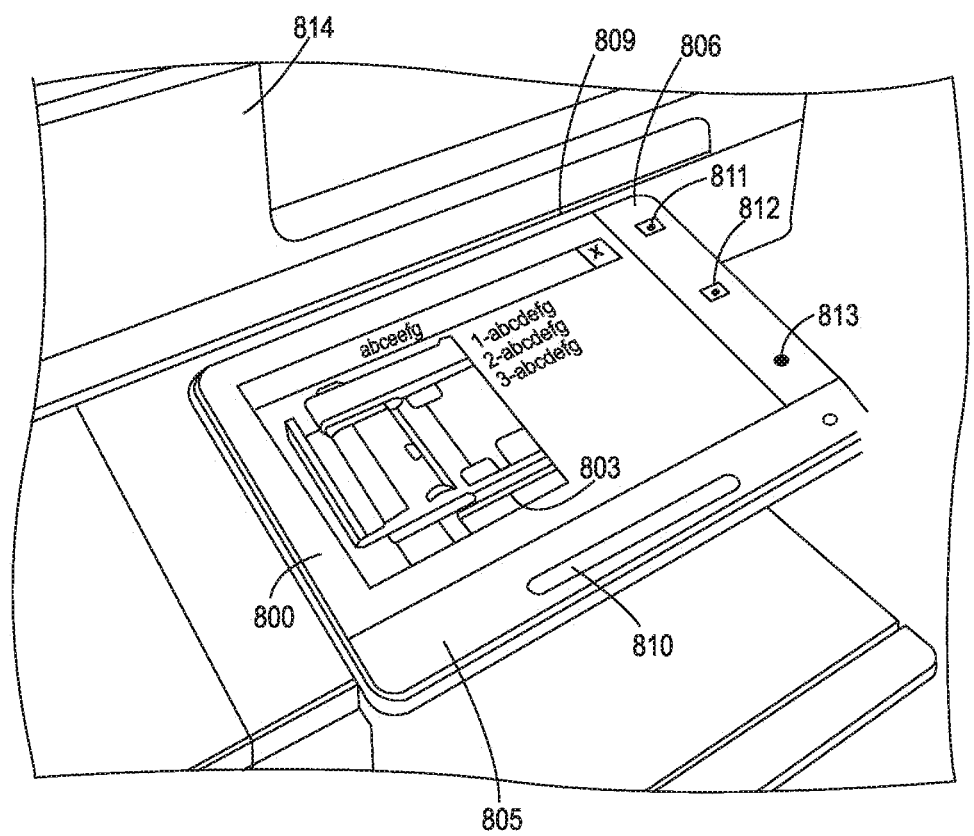
FIG. 8B illustrates an example system for conveying device status information using a light indicator feedback mechanism, according to an embodiment.

FIG. 8B shows an example system for conveying device status information using a light indicator feedback mechanism with a status indicator feedback unit 800 proximate to a print device 814. As used herein "proximate" refers to, without limitation, attached to the print device, or in the vicinity of the print device such that the status indicator feedback unit may communicate with the print device. In an embodiment, status indicator feedback unit 800 attached to a print device 814, via an attachment interface 809. In another embodiment, the status indicator feedback unit 800 may be disposed near the print device 814 and may communicate with the print device 814 via a wired or wireless communications link (such as Bluetooth®, Internet, or the like).

As shown in FIG. 8B, the status indicator feedback unit 800 may include a light emitting module 805, which includes a light emitting display 810. The status indicator feedback unit also includes a display 803 for providing more information to a user, in addition to the indicator light feedback mechanism. For example, in an embodiment, the display 803 may provide detailed information about a dynamic feedback pattern emitted by the LED module and/or an audio module using text, graphics, and/or pictures. The status indicator feedback unit 800 may also include one or more user interfaces 806 (a button, a touch screen, or the like), which includes, for example, a "home button" 811, a "power" button 812, an audio control 813, etc. One or more of the user interfaces 806 may be a membrane switch 100, 300 as described herein.

In this document, "electronic communication" refers to the transmission of data via one or more signals between two or more electronic devices, whether through a wired or wireless network, and whether directly or indirectly via one or more intermediary devices. Devices are "communicatively connected" if the devices are able to send and/or receive data via electronic communication.

A "computer," "computing device," or "electronic device" refers to a device that includes a processor and non-transitory, computer-readable memory. The memory may contain program instructions that, when executed by the processor, cause the computing device to perform one or more operations according to the program instructions. Examples of computing devices include personal computers, servers, mainframes, gaming systems, televisions, kitchen appliances, and portable electronic devices such as smartphones, smart watches, wearable electronic devices, digital cameras, fitness tracking devices, tablet computers, laptop computers, media players and the like.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A pressure-activated membrane switch, comprising:
   an electrically-conductive membrane;
   a compliant conductive material comprising an upper surface and an electrically-conductive inner surface, wherein contact between the electrically-conductive membrane and the electrically-conductive inner surface of the compliant material is configured to cause an electrical circuit, of which the switch is a part, to close; and
   a plurality of spacers dispersed between the electrically-conductive membrane and the compliant conductive material,
   wherein:
      the electrically-conductive inner surface is positioned against an upper surface of one or more of the plurality of spacers,
      the plurality of spacers are positioned and configured to form one or more gaps between the electrically-conductive membrane, the plurality of spacers, and the compliant conductive material, and
      the compliant conductive material is configured to deform between at least one of the one or more gaps when pressure is applied against the upper surface of the compliant conductive material toward the upper surface of one or more of the plurality of spacers, causing the compliant conductive material to contact the electrically-conductive membrane.

2. The pressure-activated membrane switch of claim 1, wherein the compliant conductive material includes one or more of the following: a foam or a conductive fabric.

3. The pressure-activated membrane switch of claim 1, wherein the compliant conductive material has a thickness of approximately 2 mm.

4. The pressure-activated membrane switch of claim 1, wherein the spacers include a nonconductive material.

5. The pressure-activated membrane switch of claim 1, wherein the electrically-conductive membrane includes polyester.

6. The pressure-activated membrane switch of claim 1, wherein the electrically-conductive membrane includes a conductive ink.

7. The pressure-activated membrane switch of claim 6, wherein the conductive ink includes one or more of the following: carbon or silver.

8. The pressure-activated membrane switch of claim 1, wherein the plurality of spacers form a series of columns.

9. The pressure-activated membrane switch of claim 1, wherein the pressure-activated membrane switch is in electronic communication with one or more electronic devices.

10. A method for activating a pressure-activated membrane switch, comprising:
    providing a pressure-activated membrane switch, comprising:
       an electrically-conductive membrane;
       a compliant conductive material comprising an upper surface and an electrically-conductive inner surface; and
       a plurality of spacers dispersed between the electrically-conductive membrane and the compliant conductive material,
       wherein:

the electrically-conductive inner surface is positioned against an upper surface of one or more of the plurality of spacers, and the plurality of spacers are positioned and configured to form one or more gaps between the electrically-conductive membrane, the plurality of spacers, and the compliant conductive material; and deforming the compliant conductive material between the one or more gaps when pressure is applied against the upper surface of the compliant material toward the upper surface of one or more of the plurality of spacers, causing the compliant conductive material to contact the electrically-conductive membrane, causing an electrical circuit, of which the switch is a part, to close.

11. The method of claim 10, further comprising passing an electric current through one or more of the following: the electrically-conductive membrane or compliant conductive material.

12. The method of claim 10, wherein the pressure-activated membrane switch is in electronic communication with one or more electronic devices, and further comprising:

in response to the electrical circuit closing, causing the one or more electronic devices to perform an action.

13. The method of claim 10, wherein the electrically-conductive membrane includes a conductive ink.

14. The method of claim 13, wherein the providing includes screen-printing the conductive ink onto the electronically-conductive membrane.

15. The method of claim 13, wherein the conductive ink includes one or more of the following: carbon or silver.

* * * * *